US012628878B2

(12) United States Patent
Hu et al.

(10) Patent No.: US 12,628,878 B2
(45) Date of Patent: May 19, 2026

(54) ELECTRONIC SMOKING DEVICE, HEATING METHOD THEREOF AND COMPUTER STORAGE MEDIA

(71) Applicant: Shenzhen Merit Technology Co.,Ltd., Shenzhen (CN)

(72) Inventors: Changhe Hu, Shenzhen (CN); Hengheng Dou, Shenzhen (CN); Yafei Li, Shenzhen (CN); Xingfu Zhang, Shenzhen (CN)

(73) Assignee: Shenzhen Merit Technology Co., Ltd., Shenzhen (CN)

( * ) Notice: Subject to any disclaimer, the term of this patent is extended or adjusted under 35 U.S.C. 154(b) by 924 days.

(21) Appl. No.: 17/693,359

(22) Filed: Mar. 13, 2022

(65) Prior Publication Data

US 2022/0192276 A1     Jun. 23, 2022

Related U.S. Application Data

(63) Continuation of application No. PCT/CN2020/112869, filed on Sep. 1, 2020.

(30) Foreign Application Priority Data

Sep. 12, 2019     (CN) .......................... 201910865250.4

(51) Int. Cl.
*A24F 40/57*          (2020.01)
*G05D 23/24*         (2006.01)

(52) U.S. Cl.
CPC ......... *A24F 40/57* (2020.01); *G05D 23/2401* (2013.01)

(58) Field of Classification Search
None
See application file for complete search history.

(56) References Cited

U.S. PATENT DOCUMENTS

2015/0237916 A1     8/2015  Farine et al.
2018/0000160 A1*    1/2018  Taschner ................. A24F 40/46
2018/0289909 A1    10/2018  Lindars et al.

FOREIGN PATENT DOCUMENTS

CN          104114049 A     10/2014
CN          104720119 A      6/2015
                (Continued)

OTHER PUBLICATIONS

English translation of CN 111867409 (Year: 2020).*
                (Continued)

*Primary Examiner* — Katherine A Will

(57)          ABSTRACT

An electronic smoking device, a heating method thereof and a computer storage medium are provided in the present disclosure. The electronic smoking device may at least include a heat generator. The heat generator may be configured to heat an aerosol generating substance. The heating method may include: obtaining a current electrical-characteristic value of the heat generator; determining a current temperature value of the heat generator based on the current electrical-characteristic value and a pre-acquired heat generator parameter; the heat generator parameter may represent a corresponding relation between the electrical-characteristic values and the temperature values of the heat generator; adjusting the current temperature value of the heat generator based on a current heating time, a current temperature value and the pre-acquired heating parameter. The heating parameter may represent a corresponding relation between heating time and the temperature values.

20 Claims, 3 Drawing Sheets

(56) References Cited

FOREIGN PATENT DOCUMENTS

| | | | | | |
|---|---|---|---|---|---|
| CN | 105446393 | A | 3/2016 | | |
| CN | 105027016 | B | 3/2017 | | |
| CN | 107407941 | A | 11/2017 | | |
| CN | 105446393 | B | 2/2018 | | |
| CN | 108783602 | A | 11/2018 | | |
| CN | 108991602 | A | 12/2018 | | |
| CN | 109002066 | A | 12/2018 | | |
| CN | 109043665 | A | 12/2018 | | |
| CN | 109043667 | A | 12/2018 | | |
| CN | 109043675 | A | 12/2018 | | |
| CN | 109156898 | A | 1/2019 | | |
| CN | 208370951 | U | 1/2019 | | |
| CN | 109303356 | A | 2/2019 | | |
| CN | 109330027 | A | 2/2019 | | |
| CN | 109330032 | A | 2/2019 | | |
| CN | 109561733 | A | 4/2019 | | |
| CN | 109613945 | A | 4/2019 | | |
| CN | 109730360 | A | 5/2019 | | |
| CN | 109863462 | A | 6/2019 | | |
| CN | 109907371 | A | 6/2019 | | |
| CN | 110179160 | A | 8/2019 | | |
| CN | 110771960 | A | 2/2020 | | |
| CN | 111867409 | A | * 10/2020 | ............. | A24F 40/57 |
| JP | 2015507477 | A | 3/2015 | | |
| JP | 2015524260 | A | 8/2015 | | |
| JP | 2019512225 | A | 5/2019 | | |
| WO | WO2019082282 | A1 | 5/2019 | | |
| WO | 2019129868 | A1 | 7/2019 | | |

OTHER PUBLICATIONS

Chinese First office action, Chinese Application No. 201910865250. 4, mailed Feb. 1, 2021 (23 pages).

Chinese second office action, Chinese Application No. 201910865250. 4, mailed Jun. 21, 2021 (22 pages).

Rejection decision, Chinese Application No. 201910865250.4, mailed Oct. 11, 2021 (25 pages).

International search report, International Application No. PCT/ CN2020/112869, mailed Nov. 24, 2020 (19 pages).

European Search Opinion, European Application No. EP4029391A1, mailed Jul. 11, 2022 (9 pages).

Notice of Reasons for Refusal, Japanese Application No. JP2022513691A, mailed Dec. 22, 2022 (9 pages).

Japanese Notice of Reasons for Refusal, Japanese Patent Application No. 2022-513691 , mailed Jun. 27, 2023(8 pages).

Japanese Decision of Dismissal of Amendment, Japanese Patent Application No. 2022-513691 , mailed Nov. 21, 2023(8 pages).

Japanese Fourth Notice of Reasons for Refusal, Japanese Patent Application No. 2022-513691, mailed May 20, 2025 (50 pages).

Korean Fourth Request for the Submission of an Opinion , Korean Application No. 10-2022-7010910, mailed Jun. 10, 2025 (14 pages).

* cited by examiner

ELECTRONIC SMOKING DEVICE, HEATING METHOD THEREOF AND COMPUTER STORAGE MEDIA

CROSS-REFERENCE TO RELATED APPLICATION

This application is a continuation application of International (PCT) Patent Application No. PCT/CN2020/112869 filed on Sep. 1, 2020, which claims priority to Chinese Patent Application No. 201910865250.4, filed Sep. 12, 2019 and entitled "Electronic smoking device, heating method thereof and computer storage medium", which is incorporated herein by reference in its entirety.

TECHNICAL FIELD

The present disclosure relates to the technical field of heating but not burning, in particularly relates to an electronic smoking device, a heating method thereof and a computer storage medium.

BACKGROUND

As a substitute for cigarettes, the electronic smoking device can be used safely and conveniently, and is healthy and environmental friendly, thus has found more and more attention and favor from customers. The heat but not burn electronic smoking device may operate at a relative low temperature. The aerosol generating substance may be heated at a low temperature and atomized.

Different type of aerosol generating substances may have different heating characteristics. For a same type of aerosol generating substance, different time point may correspond to different heating temperature. In general, for each kind of aerosol generating substance, a corresponding heating curve may be set. However, how to adjust the temperature of the heat generator quickly and precisely along the heating curve has become an urgent challenge waiting to be solved.

SUMMARY

To solve the above-mentioned problems, the present disclosure provides an electronic smoking device, a heating method thereof and a computer storage medium. The present disclosure can quickly and precisely control the temperature of the heat generator of the electronic smoking device, to improve the performance of the electronic smoking device.

According to one aspect of the present disclosure, a heating method of the electronic smoking device may be provided. The electronic smoking device may at least include a heat generator. The heat generator may be configured to heat an aerosol generating substance. The heating method may include: obtaining a current electrical-characteristic value of the heat generator; determining a current temperature value of the heat generator based on the current electrical-characteristic value and a pre-acquired heat generator parameter; the heat generator parameter may represent a corresponding relation between the electrical-characteristic values and the temperature values of the heat generator; adjusting the current temperature value of the heat generator based on a current heating time, a current temperature value and the pre-acquired heating parameter. The heating parameter may represent a corresponding relation between heating time and the temperature values.

The obtaining the current electrical-characteristic value of the heat generator may include: obtaining the current resistance value of the heat generator, the heat generator parameter may represent the corresponding relation between the resistance values and the temperature values of the heat generator. The determining the current temperature value of the heat generator based on the current electrical-characteristic value and the pre-acquired heat generator parameter may include: determining the current temperature value of the heat generator based on the current resistance value and the heat generator parameter.

The electronic smoking device may further include a characteristic resistor connected in series with the heat generator. The characteristic resistor may have a known resistance value. The obtaining the current resistance value of the heat generator may include: detecting a voltage value across two ends of the heat generator and a voltage value across two ends of the characteristic resistor; and calculating the current resistance value of the heat generator based on the resistance value of the characteristic resistor.

The heat generator parameter may be a table showing the corresponding relation between the resistance values and the temperatures of the heat generator. The determining the current temperature value of the heat generator based on the current resistance value and the heat generator parameter may include: looking for, from the pre-acquired table which showing the corresponding relation between the resistance values and the temperatures of the heat generator, a temperature value corresponding to the current resistance value as the current temperature value of the heat generator.

The adjusting the current temperature value of the heat generator based on the current heating time, the current temperature value and the pre-acquired heating parameter may include: obtaining the current heating time; determining a standard temperature value corresponding to the current heating time based on the heating parameter; and adjusting the current temperature value based on the standard temperature value.

The electronic smoking device may further include a power source and a controller. The controller may be connected to the power source and the heat generator, and configured to control the power source to supply electrical energy to the heat generator. The adjusting the current temperature value based on the standard temperature value may include: in response to the current temperature value being lower than the standard temperature value, increasing power of the heat generator, and in response to the current temperature value being higher than the standard temperature value, decreasing the power of the heat generator.

The controller may provide a pulsed voltage to the heat generator. Increasing the power of the heat generator may include: increasing a duty cycle of the pulsed voltage. Decreasing the power of the heat generator may include: decreasing a duty cycle of the pulsed voltage.

According to another aspect of the present disclosure, an electronic smoking device may be provided. The electronic smoking device may include: a power source; a heat generator, configured to heat an aerosol generating substance; a memory, configured to store the heat generator parameter and the heating parameter of the heat generator. The heat generator parameter may represent the corresponding relation between the electrical-characteristic values and the temperature values of the heat generator. The heating parameter may represent the corresponding relation between the heating time and the temperature values. The electronic smoking device may further include a controller. The controller may be connected to the power source and the heat generator. The controller may be configured to: obtain a current electrical-characteristic value of the heat generator;

determine a current temperature value based on the current electrical-characteristic value and the pre-acquired heat generator parameter; adjust the current temperature value of the heat generator based on the current heating time, the current temperature value and the pre-acquired heating parameter.

The electronic smoking device may further include a characteristic resistor connected in series with the heat generator. The characteristic resistor may have a known resistance value. The controller may be configured to: detect a voltage value across two ends of the heat generator and a voltage value across two ends of the characteristic resistor; and calculate the current resistance value of the heat generator based on the resistance value of the characteristic resistor.

According to another aspect of the present disclosure, a computer storage medium may be provided. The computer storage medium may store program data that, when executed by a processor, implements the above-mentioned method.

The heating method of the electronic smoking device of the present disclosure may include: obtaining the current electrical-characteristic value of the heat generator; determining the current temperature value of the heat generator based on the current electrical-characteristic value and the pre-acquired heat generator parameter; the heat generator parameter may represent the corresponding relation between the electrical-characteristic values and the temperature values of the heat generator; adjusting the current temperature value of the heat generator based on the current heating time, the current temperature value and the pre-acquired heating parameter; the heating parameter may represent the corresponding relation between heating time and the temperature values. Through the above-mentioned technical solution, it is possible to obtain the temperature value of the heat generator to determine whether the temperature value of the heat generator is normal, and to control the temperature of the heat generator, thus achieve a quick and accurate adjustment of the temperature of the heat generator. Therefore the aerosol generating substance may be better heated by the heat generator, the quality of the aerosol from the aerosol generating substance may be improved, and the operation performance of the electronic smoking device may be improved.

BRIEF DESCRIPTION OF THE DRAWINGS

In order to more clearly illustrate technical solutions in the present disclosure, the drawings required in the description of the embodiments will be briefly introduced below. Obviously, the drawings in the following description are only some embodiments of the present disclosure. For those of ordinary skills in the art, other drawings could be obtained based on these drawings without creative efforts. Among the drawings.

DETAILED DESCRIPTION

Technical solutions in embodiments of the present disclosure will be described clearly and thoroughly in connection with accompanying drawings of the embodiments of the present disclosure. It should be appreciated that, the specific embodiments described herein are for the purpose of explaining the present application only and but not for limiting it. It should also be noted that, for ease of description, the accompanying drawings show only part, but not all, of the structures relevant to the present disclosure. All other embodiments by a person of ordinary skills in the art based on embodiments of the present disclosure without creative efforts should all be within the protection scope of the present disclosure.

The terms "first" and "second" and the like in the present disclosure are used for distinguishing between different items and not for describing a particular sequence. In addition, the terms 'include', 'comprise' and any variations thereof are intended to cover non-exclusive inclusion. For example, a process, a method, a system, a product, or a device that includes a series of operations or units is not limited to the listed operations or units, but optionally includes unlisted operations or units, or optionally also includes other operations or units inherent to these processes, methods, products or devices.

Reference to 'embodiments' herein means that a specific feature, structure, or characteristic described in conjunction with the embodiments may be included in at least one embodiment of the present disclosure. The appearance of this phrase in various locations in the specification does not necessarily refer to the same embodiment, nor is it an independent or alternative embodiment mutually exclusive with other embodiments. Those skilled in the art may explicitly and implicitly understand that, the embodiments described herein may be combined with other embodiments.

Figure 1:
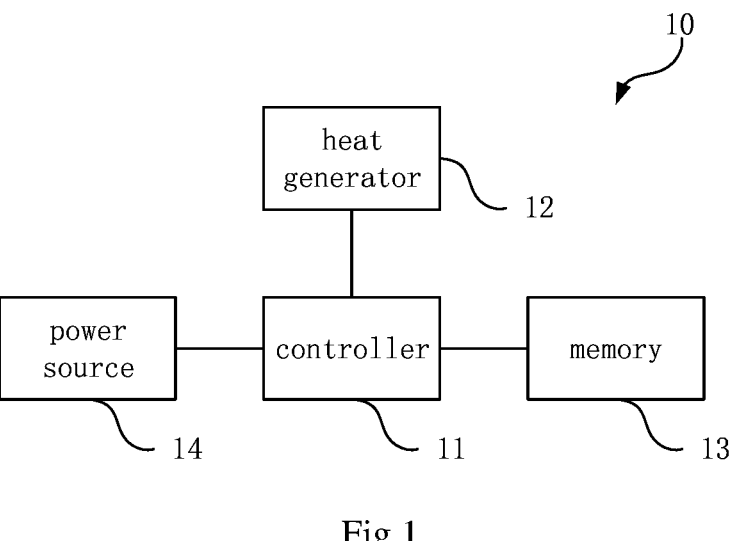
FIG. 1 is a schematic structural diagram of an electronic smoking device according to a first embodiment of the present disclosure.

Referring to FIG. 1, FIG. 1 is a schematic structural diagram of an electronic smoking device according to a first embodiment of the present disclosure. The electronic smoking device 10 may include a controller 11 and a heat generator 12, a memory 13 and a power source 14 that are connected to the controller 11.

The controller 11 may supply electrical energy from the power source 14 to the heat generator 12, thereby enabling the heat generator 12 to generate heat. The heat generator 12 may then heat an aerosol generating substance contacting with the heat generator 12 to generate aerosol. In the electronic smoking device 10, the aerosol generating substance may be solid tobacco or E-cigarette liquid, which is not limited here.

A heat generator parameter and a heating parameter may be stored in the memory 13. The controller 11 may be configured to: obtain a current electrical-characteristic value of the heat generator; determine a current temperature value based on the current electrical-characteristic value and the pre-acquired heat generator parameter; and adjust the current temperature value of the heat generator based on a current heating time, the current temperature value and the pre-acquired heating parameter. In the following embodiments, the above-mentioned process may be detailed.

Figure 2:
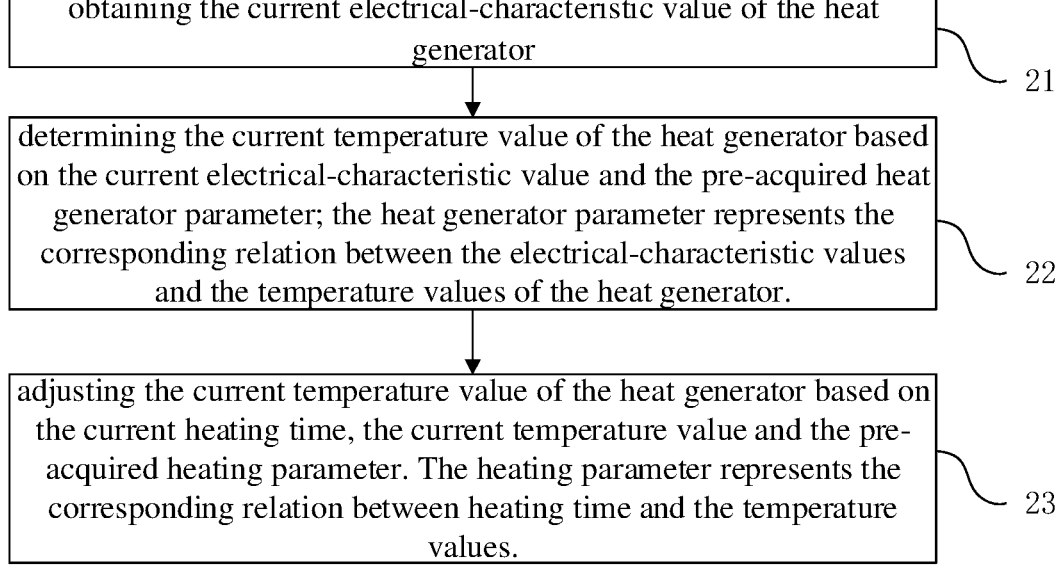
FIG. 2 is a schematic flowchart of a heating method of the electronic smoking device according to the first embodiment of the present disclosure.

Referring to FIG. 2, FIG. 2 is a schematic flowchart of the heating method of the electronic smoking device according to the first embodiment of the present disclosure. The method may include the following operations.

Operation 21: Obtaining the current electrical-characteristic value of the heat generator.

In some embodiments, the heat generator may be a resistive heat generator. The electrical-characteristic value may be a resistance value of the heat generator, or a voltage value across two ends of the heat generator, or an electrical current value of an electrical current flowing through the heat generator.

Taking the resistance value as an example, the voltage across both ends of the heat generator and the electrical current value of the electrical current flowing through the heat generator may be detected, and the resistance value of the heat generator may be calculated by equation $$R = \frac{U}{I}.$$

Figure 3:
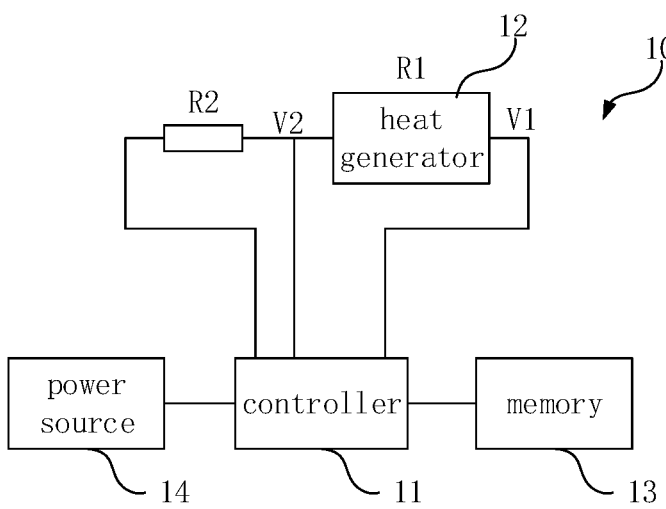
FIG. 3 is a schematic structural diagram of an electronic smoking device according to a second embodiment of the present disclosure.

In some embodiments, the voltage dividing method may be used to calculate the resistance value of the heat generator. As shown in FIG. 3, FIG. 3 is a schematic structural diagram of an electronic smoking device according to a second embodiment of the present disclosure. The electronic smoking device 10 may include a controller 11 and a heat generator 12, a memory 13 and a power source 14 that are connected to the controller 11. The heat generator 12 may be connected in series with a resistor.

Here it is assumed that, the resistance value of the heat generator 12 is R1, a resistance value of the resistor connected in series with the heat generator 12 is R2. One end of the heat generator 12 is connected to a positive electrode of the power source, the other end of the heat generator 12 is connected in series with the resistor, and the other end of the resistor is grounded. A positive electrode voltage of the heat generator 12 is V1, and a negative electrode voltage of the heat generator 12 is V2, then:

$$\frac{V1 - V2}{R1} = \frac{V2}{R2};$$

The above equation may be further deformed to yield:

$$R1 = \frac{(V1 - V2)R2}{V2};$$

Through the above-mentioned equation, the resistance value R1 of the heat generator 12 may be calculated.

Operation 22: Determining a current temperature value of the heat generator based on the current electrical-characteristic value and the pre-acquired heat generator parameter. The heat generator parameter may represent the corresponding relation between the electrical-characteristic values and the temperature values of the heat generator.

Here the resistance value may still be taken as an example of the electrical-characteristic value. Due to an influence of a material, a manufacturing process and manufacturing equipment of the heat generator and other factors, the heat generator parameter (such as "Temperature T-Resistance R" curve, an initial resistance value R0, TCR (temperature coefficient of resistance) etc) of the heat generator may be different. When the product is manufactured, the heat generator may be placed in a testing device, in which the heat generator parameters of different models of heat generators may be tested.

The heating parameter of a heat generator will be taken as an example, as is shown in the following table:

| resistance value (milliohm) | temperature (° C.) |
| --- | --- |
| 827.5 | 90.70 |
| 885.7 | 118.40 |
| 993.0 | 142.70 |
| 981.0 | 167.00 |
| 1030.3 | 190.60 |
| 1075.3 | 214.20 |
| 1171.0 | 260.60 |
| 1265.6 | 305.80 |
| 1455.3 | 392.70 |

The corresponding relation between the resistance values and temperatures of a heat generator has been shown in the above table. In some specific embodiments, the temperature value corresponding to the current resistance value may be found as the current temperature value of the heat generator from the pre-acquired table which shows the corresponding relation between the resistance values and the temperatures of the heat generator.

Operation 23: Adjusting the current temperature value of the heat generator based on a current heating time, a current temperature value and the pre-acquired heating parameter. The heating parameter may represent the corresponding relation between heating time and the temperature values.

It should be appreciated that, the heating temperature required to heat the aerosol generating substance (e.g., tobacco) to obtain a preferred taste may be usually different at different time periods.

Figure 4:
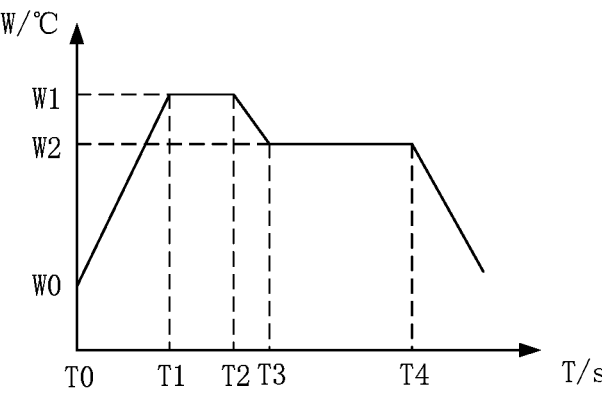
FIG. 4 is a schematic diagram of a heating curve provided in the present disclosure.

In some embodiments, as shown in FIG. 4, FIG. 4 is a schematic diagram of a heating curve provided in the present disclosure. The abscissa may represent time and the ordinate may represent temperature.

During a time period T0-T1, the heat generator may be heated to raise its temperature from a room temperature W0 to a temperature W1;

During a time period T1-T2, the temperature of the heat generator may be kept at W1;

During a time period T2-T3, the temperature of the heat generator may be lowered from W1 to a temperature W2;

During a time period T3-T4, the temperature of the heat generator may be kept at W2;

After T4, the temperature of the heat generator may be lowered from W2 to the room temperature.

In a specific embodiment, the value of T1 may be 5-10 s, the value of T2 may be 12-18 s, the value of W1 may be 320-360° C., and the value of W2 may be 300-340° C.

In some embodiments, T1=7 s, T2=15 s, W1=340° C., W2=320° C. Then, assuming that in the present embodiment, when the temperature of the heat generator drops by 1° C., the resistance of the heat generator may decrease correspondingly by 2.28 mΩ, then when the temperature drops from temperature W1 to W2, that is the temperature drops by 20° C., the resistance value may need to be adjusted downward by 20*2.28 mΩ.

In some embodiments, a set of heating parameters may be provided in advance to represent the temperatures corresponding to different heating time, as shown in the following table:

| Time<br>(10 millisecond) | Temperature<br>(° C.) |
|---|---|
| 0 | 345.00 |
| 600 | 345.00 |
| 700 | 345.00 |
| 1000 | 340.00 |
| 1010 | 340.00 |
| 1240 | 345.00 |
| 1400 | 355.00 |
| 3300 | 355.00 |
| 4500 | 346.00 |
| 7000 | 347.00 |
| 12000 | 348.00 |
| 18000 | 352.00 |
| 21400 | 357.00 |
| 24000 | 358.00 |

Figure 5:
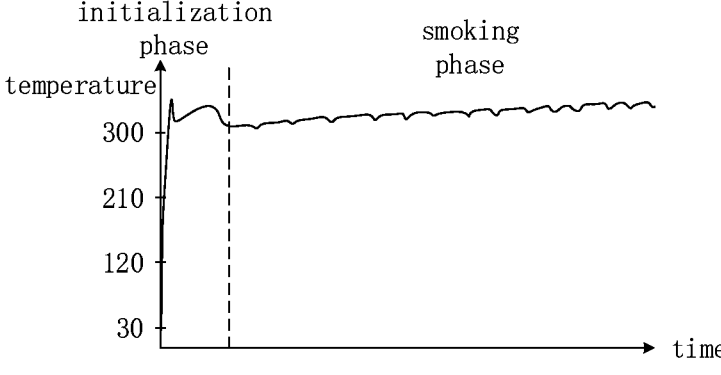
FIG. 5 is another schematic diagram of a heating curve provided in the present disclosure.

The above table represents an ideal heating state, while in an actual test process, as shown in FIG. 5, deviations may exist. FIG. 5 is another schematic diagram of a heating curve provided in the present disclosure. The abscissa may represent time and the ordinate may represent temperature. For example, at 0 millisecond, the corresponding actual temperature does not reach 345° C.

Figure 6:
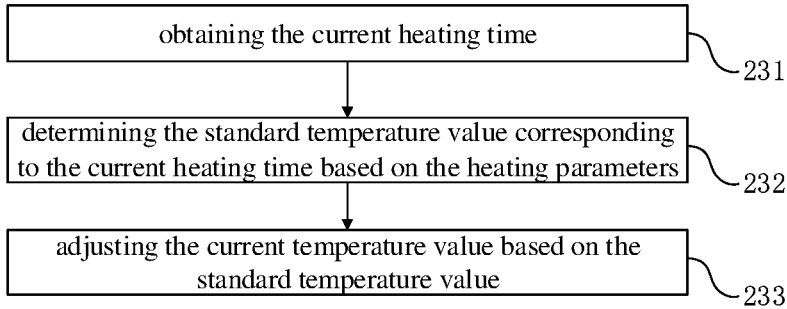
FIG. 6 is a schematic flowchart of operation 23.

Referring to FIG. 6, FIG. 6 is a schematic flowchart of operation 23. In some embodiments, operation 23 may specifically include:

Operation 231: Obtaining the current heating time.

Referring to the above table, the heating time is timed from the time point the electronic smoking device starts to operate. For example, a first time is recorded when the electronic smoking device starts working, then a current second time is obtained when a control of the heat generator begins to be performed, then the difference between the second time and the first time may be used to determine the heating time.

Operation 232: Determining a standard temperature value corresponding to the current heating time based on the heating parameter.

Operation 233: Adjusting the current temperature value based on the standard temperature value.

Specifically, when the current temperature value is lower than the standard temperature value, power of the heat generator may be increased, and when the current temperature value is higher than the standard temperature value, the power of the heat generator may be decreased.

Figure 7:
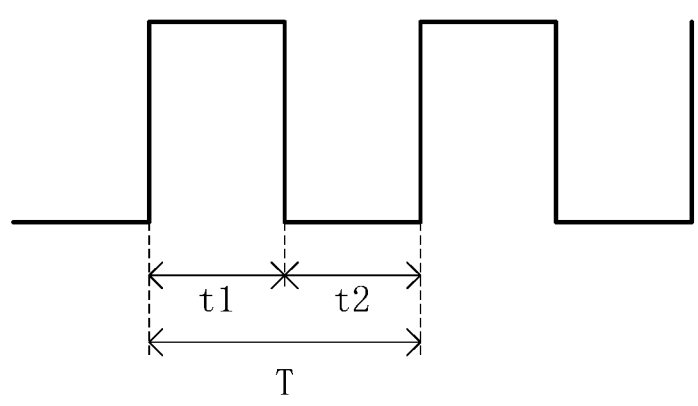
FIG. 7 is a schematic diagram of a pulsed voltage provided in the present disclosure.

For example, the controller may provide a pulsed voltage to the heat generator. When the heating temperature of the heat generator is controlled by electrical energy, the temperature control of the heat generator may include varying the pulse frequency and/or pulse amplitude and/or duty cycle of the electrical power supplied to the heat generator, and thus an aerosol apparatus may be controlled to release smoke with a better taste. As shown in FIG. 7, FIG. 7 is a schematic diagram of a pulsed voltage provided in the present disclosure. For example, if an enable switch is turned on at time period t1, a battery may provide electrical energy to the heat generator. If the enable switch is turned off at time period t2, the battery may stop to provide electrical energy to the heat generator. Therefore, by adjusting a percentage of t1 in the cycle T, the temperature of the heat generator may be adjusted. Specifically, by increasing the duty cycle of t1, the temperature of the heat generator may be increased, and by decreasing the duty cycle of t1, the temperature of the heat generator may be decreased.

Distinguishing from the prior art, the heating method of the electronic smoking device according to the present embodiment may include: obtaining the current electrical-characteristic value of the heat generator; determining the current temperature value of the heat generator based on the current electrical-characteristic value and the pre-acquired heat generator parameter; the heat generator parameter may represent the corresponding relation between the electrical-characteristic values and the temperature values of the heat generator; adjusting the current temperature value of the heat generator based on the current heating time, the current temperature value and the pre-acquired heating parameter; the heating parameter may represent the corresponding relation between heating time and the temperature values. Through the above-mentioned technical solution, it is possible to obtain the temperature value of the heat generator to determine whether the temperature value of the heat generator is normal, to control the temperature of the heat generator, and to achieve a quick and accurate adjustment of the temperature of the heat generator. Therefore the aerosol generating substance may be better heated by the heat generator, the quality of the aerosol generated from the aerosol generating substance may be improved, and the operation performance of the electronic smoking device may be improved.

Figure 8:
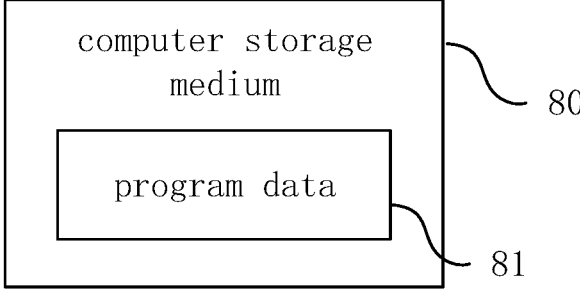
FIG. 8 is a schematic structural diagram of a computer storage medium according to an embodiment of the present disclosure.

Referring to FIG. 8, FIG. 8 is a schematic structural diagram of a computer storage medium according to an embodiment of the present disclosure. The computer storage medium 80 may store program data 81 that, when being executed by a processor, may implement the following method: obtaining the current electrical-characteristic value of the heat generator; determining the current temperature value of the heat generator based on the current electrical-characteristic value and the pre-acquired heat generator parameter; wherein the heat generator parameter may represent the corresponding relation between the electrical-characteristic values and the temperature values of the heat generator; adjusting the current temperature value of the heat generator based on the current heating time, the current temperature value and the pre-acquired heating parameter. The heating parameter may represent the corresponding relation between heating time and the temperature values.

In some embodiments, the program data may be executed by the processor to realize the following method: obtaining the current resistance value of the heat generator, the heat generator parameter may represent the corresponding relation between the resistance values and the temperature values of the heat generator; determining the current temperature value of the heat generator based on the current resistance value and the heat generator parameter.

In some embodiments, the program data may be executed by the processor to realize the following method: detecting the voltage value across two ends of the heat generator and the voltage value across two ends of the characteristic resistor; and calculating the current resistance value of the heat generator based on the resistance value of the characteristic resistor.

In some embodiments, the program data may be executed by the processor to realize the following method: looking for, from the pre-acquired table which shows the corresponding relation between the resistance values and the temperatures of the heat generator, the temperature value corresponding to the current resistance value as the current temperature value of the heat generator.

In some embodiments, the program data may be executed by the processor to realize the following method: obtaining the current heating time; determining the standard temperature value corresponding to the current heating time based on the heating parameter; adjusting the current temperature value based on the standard temperature value.

In some embodiments, the program data may be executed by the processor to realize the following method: in response to the current temperature value being lower than the standard temperature value, increasing the power of the heat generator, and in response to the current temperature value being higher than the standard temperature value, decreasing the power of the heat generator.

In some embodiments, the program data may be executed by the processor to realize the following method: increasing a duty cycle of the pulsed voltage; or decreasing a duty cycle of the pulsed voltage.

In the several embodiments provided in the present disclosure, it should be understood that, the disclosed methods and devices may be implemented in other ways. For example, the device embodiments described above are merely illustrative. For example, the division of modules or units is only a logical function division, and there may be other division manners in actual embodiments. For example, multiple units or components may be combined or integrated into another system. Or some features may be ignored or not implemented.

The units illustrated as separate components may or may not be physically separate, and the components illustrated as units may or may not be physical units. The units may be located in one place or may be distributed on multiple network units. Some or all of the units may be selected as per actual needs to fulfill the object of the present disclosure.

In addition, each functional unit in embodiments of the present disclosure may be integrated into one processing unit, or may be physically separate units, or two or more units may be integrated into one unit. The above-mentioned integrated units may be embodies in the form of hardware or software functional unit.

If the integrated units in the above-mentioned other embodiments are implemented in the form of software functional units and sold or used as independent product, then they could be stored in a computer-readable storage medium. Based on such kind of understanding, the technical solution of the present disclosure essentially or a part contributing to the prior art or part or all of the technical solution may be embodied in the form of software products, The computer software products may be stored in one storage medium. The computer software products may include some instructions for causing a computer device (which may be a personal computer, a server or a network device, etc.) or a processor to implement all or part of the operations of the methods described in various embodiments of the present disclosure. The afore-mentioned storage medium may include: U disk, mobile hard disk drive, Read-Only Memory (ROM), Random Access Memory (RAM), magnetic disk or CD-ROM and other media that can store program codes.

The above are only implementations of the present disclosure, and do not limit the patent scope of the present disclosure. Any equivalent changes to the structure or processes made by the description and drawings of this application or directly or indirectly used in other related technical field are included in the protection scope of this application.

What is claimed is:

1. A heating method of an electronic smoking device, wherein the electronic smoking device at least comprises a heat generator configured to heat an aerosol generating substance, and the heating method comprises:
obtaining a current electrical-characteristic value of the heat generator;

determining, based on the current electrical-characteristic value and a pre-acquired heat generator parameter, a current temperature value of the heat generator; wherein the heat generator parameter represents a corresponding relation between electrical-characteristic values and temperature values of the heat generator; and adjusting, based on a current heating time, the current temperature value and a pre-acquired heating parameter, the current temperature value of the heat generator; wherein the heating parameter represents a corresponding relation between heating time and temperature values;

in a heating curve, the corresponding relation between the heating time and the temperature values is as follows:
during a time period T0-T1, the heat generator is heated to raise its temperature from a room temperature W0 to a temperature W1;
during a time period T1-T2, the temperature of the heat generator is kept at W1;
during a time period T2-T3, the temperature of the heat generator is lowered from W1 to a temperature W2;
during a time period T3-T4, the temperature of the heat generator is kept at W2; and
after T4, the temperature of the heat generator is lowered from W2 to the room temperature W0;
wherein T0, T1, T2, T3, and T4 are the heating time, and W0, W1, and W2 are the temperature values.

2. The method as claimed in claim 1, wherein
the obtaining the current electrical-characteristic value of the heat generator comprises:
obtaining a current resistance value of the heat generator, wherein the heat generator parameter represents a corresponding relation between resistance values and temperature values of the heat generator;
the determining, based on the current electrical-characteristic value and the pre-acquired heat generator parameter, the current temperature value of the heat generator comprises:
determining, based on the current resistance value and the heat generator parameter, the current temperature value of the heat generator.

3. The method as claimed in claim 2, wherein
the electronic smoking device further comprises a characteristic resistor connected in series with the heat generator, the characteristic resistor has a known resistance value;
the obtaining the current resistance value of the heat generator comprises:
detecting a voltage value across two ends of the heat generator and a voltage value across two ends of the characteristic resistor; and
calculating, based on the resistance value of the characteristic resistor, the current resistance value of the heat generator.

4. The method as claimed in claim 2, wherein
the heat generator parameter is a table showing the corresponding relation between the resistance values and the temperatures of the heat generator;
the determining, based on the current resistance value and the heat generator parameter, the current temperature value of the heat generator comprises:
looking for, from the pre-acquired table showing the corresponding relation between the resistance values and the temperatures of the heat generator, a temperature value corresponding to the current resistance value as the current temperature value of the heat generator.

5. The method as claimed in claim 1, wherein the adjusting, based on the current heating time, the current temperature value and the pre-acquired heating parameter, the current temperature value of the heat generator comprises:

obtaining the current heating time;

determining, based on the heating parameter, a standard temperature value corresponding to the current heating time; and adjusting, based on the standard temperature value, the current temperature value.

6. The method as claimed in claim 5, wherein the electronic smoking device further comprises a power source and a controller, the controller is connected to the power source and the heat generator, and controls the power source to supply electrical energy to the heat generator;

the adjusting, based on the standard temperature value, the current temperature value comprises:

in response to the current temperature value being lower than the standard temperature value, increasing power of the heat generator, and in response to the current temperature value being higher than the standard temperature value, decreasing the power of the heat generator.

7. The method as claimed in claim 6, wherein the controller supplies a pulsed voltage to the heat generator;

the increasing the power of the heat generator comprises:

increasing a duty cycle of the pulsed voltage;

the decreasing the power of the heat generator comprises:

decreasing a duty cycle of the pulsed voltage.

8. The method as claimed in claim 1, wherein a value of T1 ranges from 5 s to 10 s, a value of T2 ranges from 12 s to 18 s, a value of W1 ranges from 320° C. to 360° C., and a value of W2 ranges from 300° C. to 340° C.

9. An electronic smoking device, comprising:

a power source;

a heat generator, configured to heat an aerosol generating substance;

a memory, configured to store a heat generator parameter and a heating parameter of the heat generator, the heat generator parameter represents a corresponding relation between electrical-characteristic values and temperature values of the heat generator; the heating parameter represents a corresponding relation between heating time and the temperature values;

a controller, connected to the power source and the heat generator and configured to:

obtain a current electrical-characteristic value of the heat generator;

determine, based on the current electrical-characteristic value and a pre-acquired heat generator parameter, a current temperature value of the heat generator; and adjust, based on a current heating time, the current temperature value and a pre-acquired heating parameter, the current temperature value of the heat generator;

in a heating curve, the corresponding relation between the heating time and the temperature values is as follows:

during a time period T0-T1, the heat generator is heated to raise its temperature from a room temperature W0 to a temperature W1;

during a time period T1-T2, the temperature of the heat generator is kept at W1;

during a time period T2-T3, the temperature of the heat generator is lowered from W1 to a temperature W2;

during a time period T3-T4, the temperature of the heat generator is kept at W2; and after T4, the temperature of the heat generator is lowered from W2 to the room temperature W0;

wherein T0, T1, T2, T3, and T4 are the heating time, and W0, W1, and W2 are the temperature values.

10. The electronic smoking device as claimed in claim 9, wherein the heat generator parameter represents a corresponding relation between resistance values and the temperature values of the heat generator;

the controller is further configured to:

determine, based on the current resistance value and the heat generator parameter, the current temperature value of the heat generator.

11. The electronic smoking device as claimed in claim 10, wherein the electronic smoking device further comprises a characteristic resistor connected in series with the heat generator, the characteristic resistor has a known resistance value;

the controller is further configured to:

detect a voltage value across two ends of the heat generator and a voltage value across two ends of the characteristic resistor; and calculate, based on the resistance value of the characteristic resistor, the current resistance value of the heat generator.

12. The electronic smoking device as claimed in claim 10, wherein the heat generator parameter is a table showing the corresponding relation between the resistance values and the temperatures of the heat generator;

the controller is further configured to:

look for, from the pre-acquired table which showing the corresponding relation between the resistance values and the temperatures of the heat generator, a temperature value corresponding to the current resistance value as the current temperature value of the heat generator.

13. The electronic smoking device as claimed in claim 9, wherein the controller is further configured to:

obtain the current heating time;

determine, based on the heating parameter, a standard temperature value corresponding to the current heating time; and adjust, based on the standard temperature value, the current temperature value.

14. The electronic smoking device as claimed in claim 13, wherein the electronic smoking device further comprises a power source and a controller, the controller is connected to the power source and the heat generator, and controls the power source to supply electrical energy to the heat generator;

the controller is further configured to:

in response to the current temperature value being lower than the standard temperature value, increase power of the heat generator, and in response to the current temperature value being higher than the standard temperature value, decrease the power of the heat generator.

15. A non-transitory computer storage medium, wherein program data is stored in the non-transitory computer storage medium, the program data, when being executed by a processor, is configured to implement a heating method of an electronic smoking device, wherein the electronic smoking device at least comprises a heat generator configured to heat an aerosol generating substance, and the heating method comprises:

obtaining a current electrical-characteristic value of the heat generator;

determining, based on the current electrical-characteristic value and a pre-acquired heat generator parameter, a current temperature value of the heat generator; wherein the heat generator parameter represents a corresponding relation between electrical-characteristic values and temperature values of the heat generator; and adjusting, based on a current heating time, the current temperature value and a pre-acquired heating parameter, the current temperature value of the heat generator; wherein the heating parameter represents a corresponding relation between heating time and temperature values;

in a heating curve, the corresponding relation between the heating time and the temperature values is as follows:

during a time period T0-T1, the heat generator is heated to raise its temperature from a room temperature W0 to a temperature W1;

during a time period T1-T2, the temperature of the heat generator is kept at W1;

during a time period T2-T3, the temperature of the heat generator is lowered from W1 to a temperature W2;

during a time period T3-T4, the temperature of the heat generator is kept at W2; and after T4, the temperature of the heat generator is lowered from W2 to the room temperature W0;

wherein T0, T1, T2, T3, and T4 are the heating time, and W0, W1, and W2 are the temperature values.

16. The non-transitory computer storage medium as claimed in claim 15, wherein the obtaining the current electrical-characteristic value of the heat generator comprises:

obtaining a current resistance value of the heat generator, wherein the heat generator parameter represents a corresponding relation between resistance values and temperature values of the heat generator;

the determining, based on the current electrical-characteristic value and the pre-acquired heat generator parameter, the current temperature value of the heat generator comprises:

determining, based on the current resistance value and the heat generator parameter, the current temperature value of the heat generator.

17. The non-transitory computer storage medium as claimed in claim 16, wherein the electronic smoking device further comprises a characteristic resistor connected in series with the heat generator, the characteristic resistor has a known resistance value;

the obtaining the current resistance value of the heat generator comprises:

detecting a voltage value across two ends of the heat generator and a voltage value across two ends of the characteristic resistor; and calculating, based on the resistance value of the characteristic resistor, the current resistance value of the heat generator.

18. The non-transitory computer storage medium as claimed in claim 16, wherein the heat generator parameter is a table showing the corresponding relation between the resistance values and the temperatures of the heat generator;

the determining, based on the current resistance value and the heat generator parameter, the current temperature value of the heat generator comprises:

looking for, from the pre-acquired table showing the corresponding relation between the resistance values and the temperatures of the heat generator, a temperature value corresponding to the current resistance value as the current temperature value of the heat generator.

19. The non-transitory computer storage medium as claimed in claim 15, wherein the adjusting, based on the current heating time, the current temperature value and the pre-acquired heating parameter, the current temperature value of the heat generator comprises:

obtaining the current heating time;

determining, based on the heating parameter, a standard temperature value corresponding to the current heating time; and adjusting, based on the standard temperature value, the current temperature value.

20. The non-transitory computer storage medium as claimed in claim 19, wherein the electronic smoking device further comprises a power source and a controller, the controller is connected to the power source and the heat generator, and controls the power source to supply electrical energy to the heat generator;

the adjusting, based on the standard temperature value, the current temperature value comprises:

in response to the current temperature value being lower than the standard temperature value, increasing power of the heat generator, and in response to the current temperature value being higher than the standard temperature value, decreasing the power of the heat generator.

* * * * *